(12) United States Patent
McDowell

(10) Patent No.: US 6,508,673 B2
(45) Date of Patent: Jan. 21, 2003

(54) LOW COST SMART CARD READER, EXTENSION STYLE, WITH WIPING CONTACTS

(76) Inventor: Jennifer Lyn McDowell, 4815 Meadow Park La., Suwanee, GA (US) 30024

( * ) Notice: Subject to any disclaimer, the term of this patent is extended or adjusted under 35 U.S.C. 154(b) by 0 days.

(21) Appl. No.: 09/826,297

(22) Filed: Apr. 4, 2001

(65) Prior Publication Data

US 2001/0039146 A1 Nov. 8, 2001

Related U.S. Application Data

(60) Provisional application No. 60/194,841, filed on Apr. 5, 2000.

(51) Int. Cl.[7] .............................................. H01R 24/00
(52) U.S. Cl. ....................... 439/630; 439/188; 439/489; 439/326; 235/441
(58) Field of Search ................................. 439/326, 325, 439/327, 630, 489, 188, 260; 235/441, 482

(56) References Cited

U.S. PATENT DOCUMENTS

| 3,246,279 A | 4/1966 | Storcel |
|---|---|---|
| 4,548,452 A | 10/1985 | Gillett |
| 4,675,516 A | 6/1987 | Guion |

(List continued on next page.)

FOREIGN PATENT DOCUMENTS

| DE | 196 30 958 A1 | 2/1998 |
|---|---|---|
| EP | 0 505 932 A2 | 9/1992 |
| EP | 0 617 488 A1 | 9/1994 |
| EP | 0 715 272 A2 | 6/1996 |
| EP | 0 782 088 A1 | 7/1997 |
| EP | 0 849 842 A2 | 6/1998 |
| EP | 0 896 289 A2 | 2/1999 |
| EP | 0 924 972 A2 | 6/1999 |
| EP | 1 050 840 A2 | 11/2000 |
| FR | 2 753 597 A1 | 3/1998 |
| GB | 2 329 532 A | 3/1999 |
| WO | WO 96/30866 | 10/1996 |
| WO | WO 97/40467 | 10/1997 |
| WO | WO 98/04994 | 2/1998 |
| WO | WO 98/22902 | 5/1998 |
| WO | WO 98/24045 | 6/1998 |
| WO | WO 98/27507 | 6/1998 |
| WO | WO 98/28821 | 7/1998 |
| WO | WO 98/28823 | 7/1998 |
| WO | WO 98/38592 | 7/1998 |
| WO | WO 98/43199 | 10/1998 |
| WO | WO 98/57290 | 12/1998 |

*Primary Examiner*—Tho D. Ta
*Assistant Examiner*—Briggitte Hammond
(74) *Attorney, Agent, or Firm*—Hoffman & Baron, LLP

(57) ABSTRACT

The present invention provides a reduced cost smart card connector for connecting a contact pad of an IC card to a printed circuit board. The connector of the present invention requires only a single housing component and a plurality of signal contacts positioned therein for effective contact with and retention of a smart card. The contacts are insertably accommodated in the housing from a back portion thereof such that a deflectable spring-like portion of each contact is positioned in a cantilever type configuration in a card insertion slot defined by a peripheral housing wall. The spring-like portions are provided as resilient contacts protruding normally from a tail portion thereof, establishing wiping engagement with one or more contact pads on the card. The contacts are placed sufficiently within the insertion slot plane so as to accommodate sliding engagement of a; plurality of correspondingly configured contact pads and to further ensure wiping engagement with the contact pads so as to clear the contact pads of dirt and debris. .In addition, the contacts are positioned in two separate planes facing in a common direction, effecting wiping of the contact pads in a space-saving configuration.

10 Claims, 3 Drawing Sheets

U.S. PATENT DOCUMENTS

| | | |
|---|---|---|
| 4,695,117 A | 9/1987 | Kysiak |
| 4,752,234 A | 6/1988 | Reichardt et al. |
| 4,780,603 A | 10/1988 | Hamada |
| 4,806,103 A | 2/1989 | Kniese et al. |
| 4,818,239 A | 4/1989 | Erk |
| 4,820,186 A | 4/1989 | Fuji |
| 4,843,223 A | 6/1989 | Shino |
| 4,874,323 A | 10/1989 | Shibano |
| 4,887,188 A | 12/1989 | Yoshida et al. |
| 4,900,272 A | 2/1990 | Langé et al. |
| 4,900,273 A | 2/1990 | Pernet |
| 4,902,233 A | 2/1990 | Maillot |
| 4,904,852 A | 2/1990 | Mita et al. |
| 4,931,991 A | 6/1990 | Cvijanovich |
| 4,932,885 A | 6/1990 | Scholz |
| 4,990,758 A | 2/1991 | Shibano et al. |
| 5,013,255 A | 5/1991 | Juret et al. |
| 5,040,991 A | 8/1991 | Collier |
| 5,091,618 A | 2/1992 | Takahashi |
| 5,161,992 A | 11/1992 | Birch |
| 5,169,345 A | 12/1992 | Pernet |
| 5,176,523 A | 1/1993 | Lai |
| 5,198,645 A | 3/1993 | Martin et al. |
| 5,201,661 A | 4/1993 | Ii |
| 5,231,274 A | 7/1993 | Reynier et al. |
| 5,259,777 A | 11/1993 | Schuder et al. |
| 5,269,707 A | 12/1993 | Reichardt et al. |
| 5,334,827 A | 8/1994 | Bleier et al. |
| 5,370,544 A | 12/1994 | Reichardt et al. |
| 5,380,997 A | 1/1995 | Hania et al. |
| 5,403,208 A | 4/1995 | Felcman et al. |
| 5,470,246 A | 11/1995 | Mosquera |
| 5,470,260 A | 11/1995 | Schwan et al. |
| 5,474,468 A | 12/1995 | Chishima et al. |
| 5,520,551 A | 5/1996 | Broschard, III |
| 5,554,840 A | 9/1996 | Saroya |
| 5,586,890 A | 12/1996 | Braun |
| 5,594,621 A | 1/1997 | van Rumpt |
| 5,599,203 A | 2/1997 | Broschard, III |
| 5,603,629 A | 2/1997 | DeFrasne et al. |
| 5,627,416 A | 5/1997 | Kantner |
| 5,640,307 A | 6/1997 | Bleier et al. |
| 5,641,295 A | 6/1997 | Koyama |
| 5,653,610 A | 8/1997 | Broschard, III |
| 5,667,397 A | 9/1997 | Broschard, III et al. |
| 5,667,408 A | 9/1997 | Broschard, III et al. |
| 5,674,080 A | 10/1997 | Takemura |
| 5,677,830 A | 10/1997 | Nogas et al. |
| 5,713,747 A | 2/1998 | Hsia et al. |
| 5,715,141 A | 2/1998 | Karlsson |
| 5,775,929 A | 7/1998 | Hashiguchi |
| 5,775,937 A | 7/1998 | Bricaud et al. |
| 5,775,949 A | 7/1998 | Bricaud et al. |
| 5,780,827 A | 7/1998 | Zolkos et al. |
| 5,800,200 A | 9/1998 | Brioaud et al. |
| 5,807,124 A | 9/1998 | Brichaud et al. |
| 5,823,828 A | 10/1998 | Bricaud et al. |
| 5,830,008 A | 11/1998 | Broschard, III |
| 5,839,913 A | 11/1998 | Fumikura |
| 5,848,920 A | 12/1998 | Klein et al. |
| 5,882,230 A | 3/1999 | Bricaud et al. |
| 5,883,372 A | 3/1999 | Kim |
| 5,892,216 A | 4/1999 | Grant et al. |
| 5,901,049 A | 5/1999 | Schmidt et al. |
| 5,928,036 A | 7/1999 | Thrush |
| 5,936,222 A | 8/1999 | Korunsky et al. |
| 5,945,662 A | 8/1999 | Vallat |
| 5,975,959 A | 11/1999 | Joly |
| 5,984,183 A | 11/1999 | Moriya |
| 5,997,345 A | 12/1999 | Inadama |
| 5,997,356 A | 12/1999 | Chang |
| 6,004,155 A | 12/1999 | Wu |
| 6,015,311 A | 1/2000 | Benjamin et al. |
| 6,039,599 A | 3/2000 | Benjamin et al. |
| 6,126,486 A | 10/2000 | Chang |
| 6,129,571 A | 10/2000 | Ikemoto |
| 6,129,588 A | 10/2000 | Chang |
| 6,200,166 B1 | 3/2001 | King |
| 6,206,710 B1 | 3/2001 | Chen |

LOW COST SMART CARD READER, EXTENSION STYLE, WITH WIPING CONTACTS

This application claims the benefit of U.S. Provisional Application No. 60/194,841, filed on Apr. 5, 2000.

FIELD OF THE INVENTION

The present invention relates generally to an electrical connector that supports an integrated circuit (IC) card to a printed circuit board (PCB). More particularly, the present invention is directed to a chip card connector that reduces the number of components for manufacture and assembly and provides for easy contact using signal contacts on two different planes.

BACKGROUND OF THE INVENTION

The electronic industry has seen growth in the use of flat plastic cards incorporating computer chips therein. These chip or IC cards are also commonly referred as to as "smart cards". A smart card is a card incorporating at least one electronic component to which electrical connection must be made. These cards include contact pads so as to allow electrical connection to the electronic component on the card. Smart cards are commonly used in various consumer-oriented machines such as telephones, bank machines, vending machines, mobile phones and electronics and the like. In this disclosure, the terms "IC card", "chip card" and "smart card" will be used interchangeably.

In order to effect electrical connection between the smart card and a PCB, an electrical connector is employed such that the connector securably accommodates the smart card therein. The art has seen numerous electrical connectors specifically designed for use in removably connecting various types of smart cards. Although such connectors effectively establish electrical contact between an IC card and a PCB, the use thereof may not be desirable in configurations where conservation of materials and space is essential. Prior art designs typically require at least two housing components that subscribe to the particular dimensions of a chip card inserted therein. The required number of components required to complete assembly of the smart card reader contributes to increased costs associated with manufacture of such reading devices. In addition, the number of parts in the assembly contributes to increased device thickness and increased outside dimensions. Such increased dimensions contribute to problems of packaging the device within an already crowded PCB configuration.

Thus, it is desirable to provide a chip card reading device which reduces the amount of requisite construction materials and which implements a contact configuration so as to effect a satisfactory electrical connection using a minimum number of components.

SUMMARY OF THE INVENTION

It is an object of the present invention to provide a smart card connector for electrical connection of an IC card to a PCB.

It a further object of the present invention to provide an electrical connector that optimizes the available space in a PCB configuration while minimizing the cost of manufacture thereof.

It is still a further object of the present invention to reduce the number of components needed to establish an electrical connection between a chip card and a connector, yet still ensure proper electrical connection therebetween.

The present invention provides a reduced cost smart card connector for connecting a contact pad of an IC card to a printed circuit board. The connector of the present invention requires only a single housing component and a plurality of signal contacts positioned therein for effective contact with and retention of a smart card. The contacts are insertably accommodated in the housing from a back portion thereof such that a deflectable spring-like portion of each contact is positioned in a cantilever type configuration in a card insertion slot defined by a peripheral housing wall. The spring-like portions are provided as resilient contacts protruding normally from a tail portion thereof, establishing wiping engagement with one or more contact pads on the card. The contacts are placed sufficiently within the insertion slot plane so as to accommodate sliding engagement of a plurality of correspondingly configured contact pads and to further ensure wiping engagement with the contact pads so as to clear the contact pads of dirt and debris. In addition, the contacts are positioned in two separate planes facing in a common direction, effecting wiping of the contact pads in a space-saving configuration. The present invention thereby addresses the need to reduce the current number of components while simultaneously increasing the available packaging space therearound to accommodate improvements of an electronic device within which the connector is utilized.

In accordance, with a particular arrangement of the present invention, an electrical connector for establishing electrical connection between at least one contact pad of an IC card and conductive elements of a printed circuit board comprises a substantially planar integrally formed connector housing supportable on the printed circuit board. The housing has an upper surface, a lower surface and a peripheral wall defining a card insertion slot for insertably accommodating the IC card therein. A plurality of electrical contacts are supported by the housing wherein each contact includes an interior contact extent having a deflectable, spring-portion defined thereat. The interior contact extent provides for electrical engagement with a contact pad of the IC card. The electrical contacts also include an exterior contact extent for termination to the printed circuit board.

DETAILED DESCRIPTION OF THE PREFERRED EMBODIMENT

The present invention provides for an integrated chip (IC) card connector that reduces the number of components required to establish an electrical connection between a contact pad on the card and corresponding conductive elements of a printed circuit board (PCB). The connector requires a unitary housing having a card insertion slot defined therein for securable accommodation of a correspondingly sized and shaped IC card. The housing supports a plurality of signal contacts at a rearward portion thereof such that the contacts are arranged in two different planes for engagement of a variety of correspondingly configured contact pads. A single body is implemented in place of a conventional reading unit and card guide combination to reduce the construction and assembly costs associated with production and installation of chip card reading devices and also to decrease the thickness of the connector and its outside dimensions while ensuring an efficient electrical connection.

Now referring to FIGS. 1–3, a preferred embodiment of the present invention can now be described.

Figure 1:
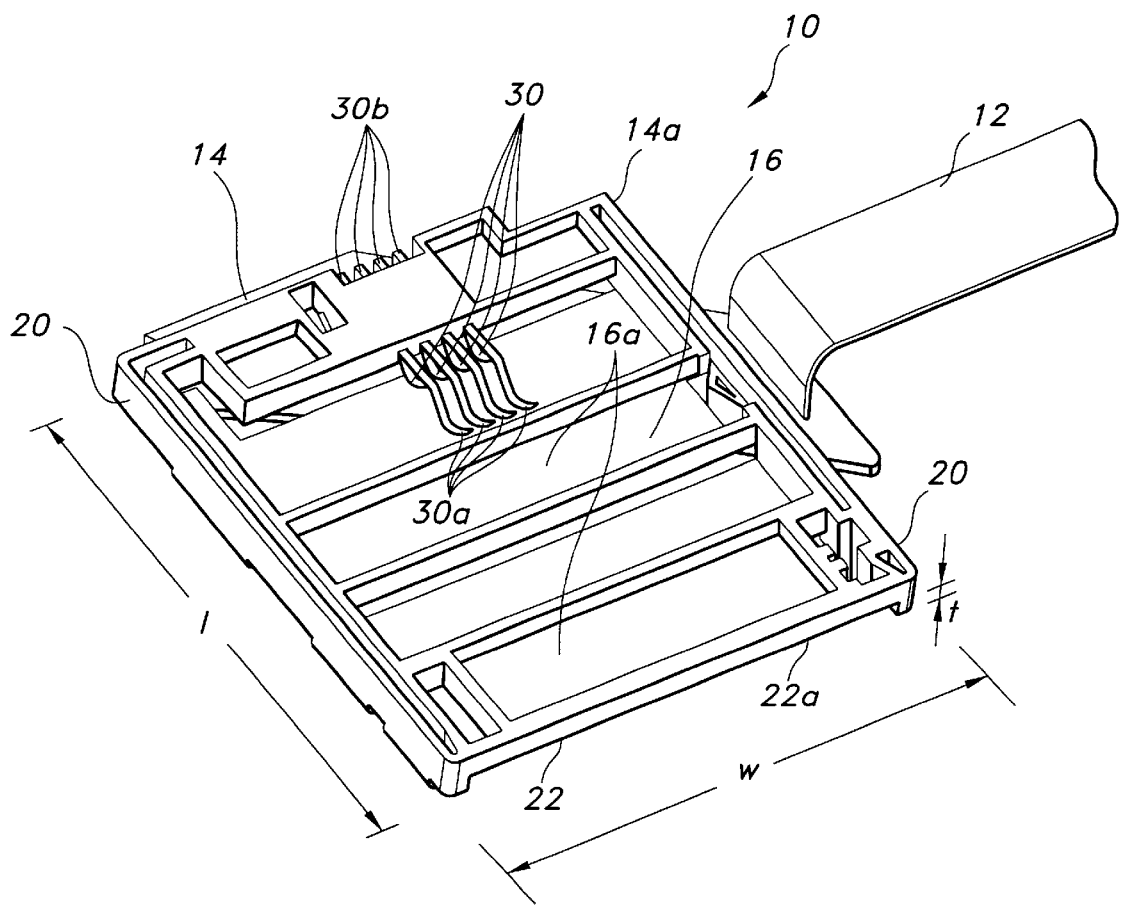
FIG. 1 is a top perspective view of a smart card connector of the present invention having a jumper cable affixed thereto.

A smart card connector 10 of the present invention is provided in FIG. 1 having a conventional flexible jumper cable 12 connected thereto. Connector 10 includes a housing 14 having a substantially planar upper surface 16, a parallel opposed bottom surface 18 and a length l and width w which define the surrounding structure within which a chip card is inserted into the connector. A peripheral wall 20 demarcates a card insertion slot 22 between upper surface support guides 16a and lower surface support guides 18a. Slot 22 has a thickness, t, substantially corresponding to a thickness of a smart card 25 inserted therewithin (shown in FIGS. 2 and 3).

Figure 2:
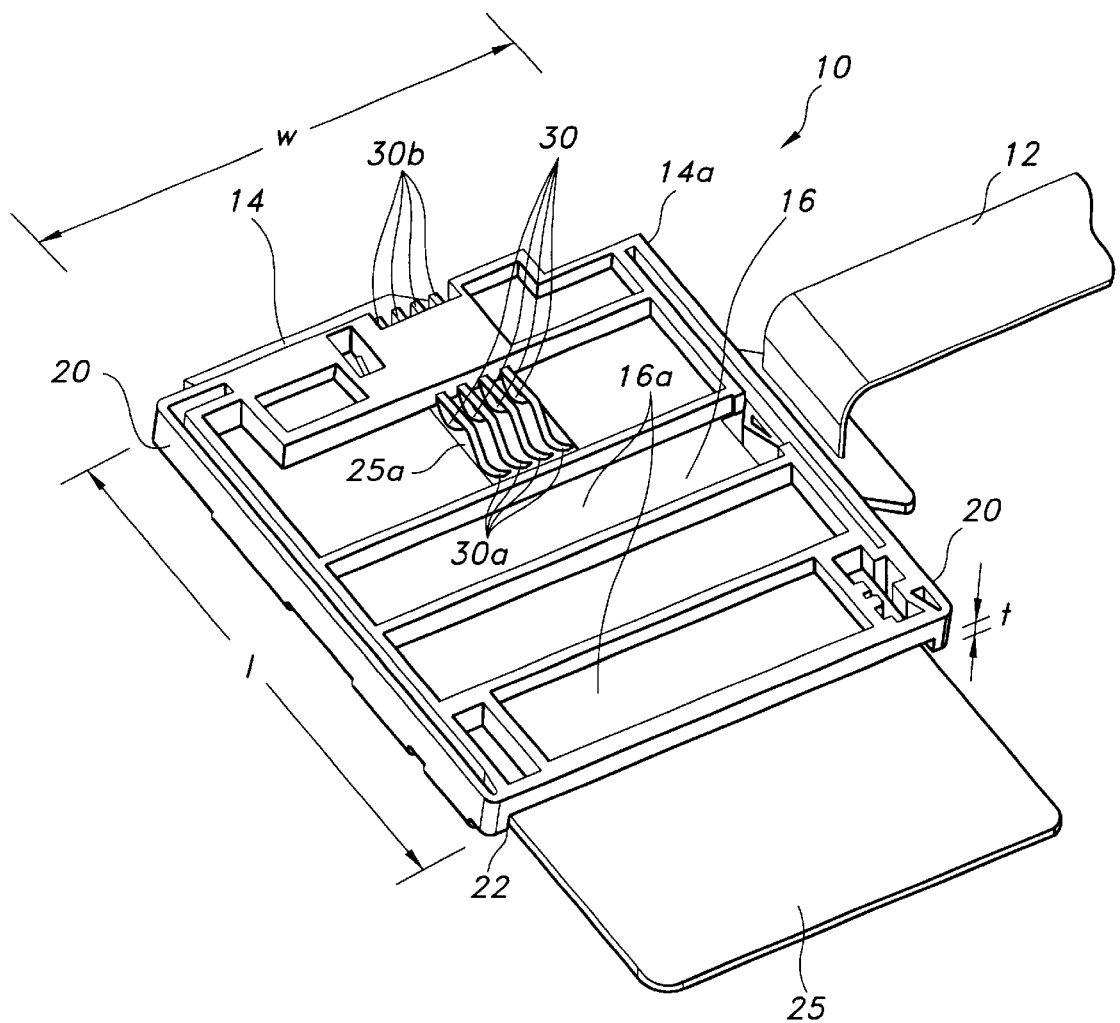
FIG. 2 is a top perspective view of the smart card connector of FIG. 1 having a smart card inserted therewithin.
Figure 3:
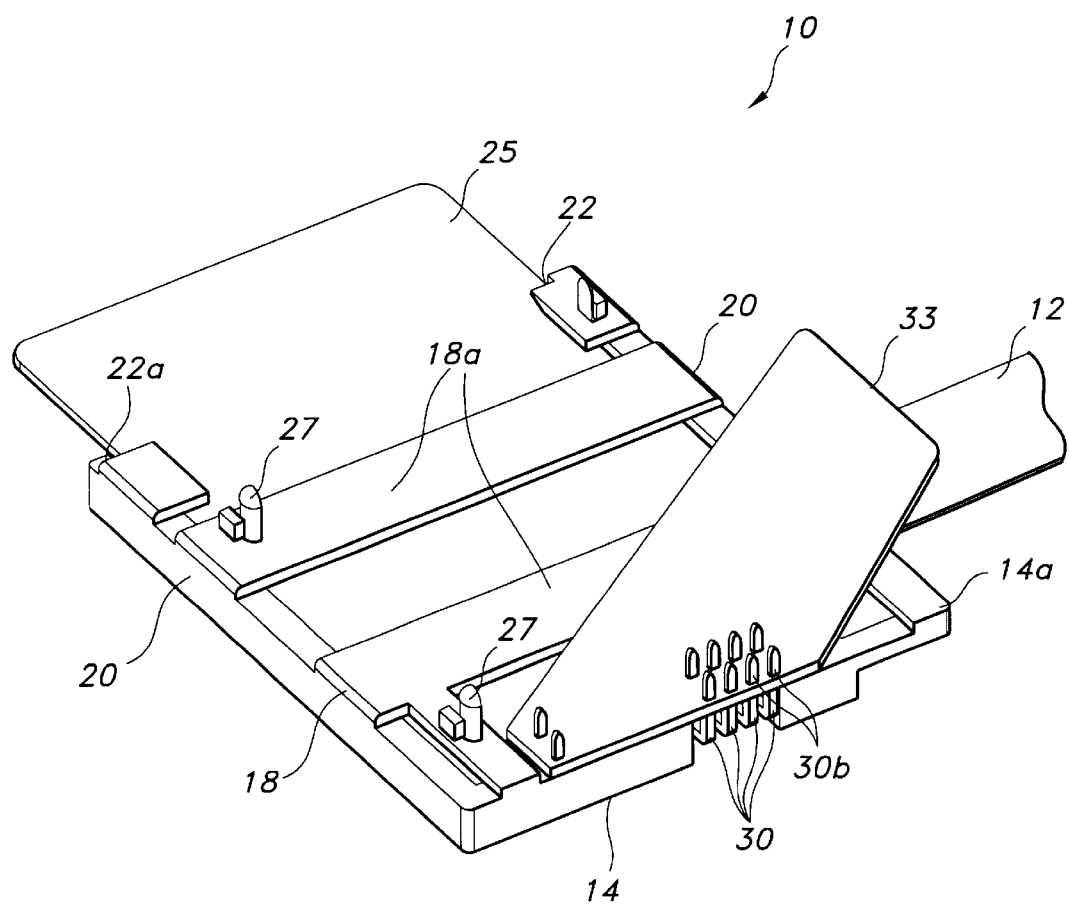
FIG. 3 is a bottom perspective view of the smart card connector of FIGS. 1 and 2 in mechanical and electrical communication with a flexible printed circuit board.

As further shown in FIGS. 2 and 3, a plurality of signal contacts 30 are positioned within a rearward portion 14a of housing 14 opposite a slot ingress 22a. Contacts 30 protrude from the rearward portion 14a and extend normal relative to a plane in which slot 22 is defined. Each of contacts 30 includes a deflectable spring-like interior extent 30a for wiping engagement with contact pads 25a defined on a surface of card 25 and an exterior extent 30b having a tail portion for termination with a PCB such as flexible PCB 33 (shown in FIG. 3). As card 25 is linearly inserted into slot 22 and toward rearward portion 14a, spring-like portions 30a come into sliding engagement with contact pad 25a of card 25 so as to clean dirt and debris therefrom. A similar wiping action is experienced by card 25 upon retraction of the card from slot 22 after completion of a card reading operation. In addition, at least one support leg 27 may protrude from bottom surface 18 for affixing connector 10 to a connector support surface.

Unlike connectors utilizing a base and cover combination, connector 10 can simply accept a smart card 25 in slot 22. It is important that the surface of card 25 having contact pad 25a thereon is face up in relation to upper surface 16 of housing 14 so as to align contact portions 30a with contact pad 25a. Guides 16a and 18a cooperate to maintain the planar insertion path of card 25 until engagement of contact pad 25a initiates a card reading operation. It is further noted that the housing may support one or more switching contacts (not shown) as is conventionally known, so as to provide an indication of proper card insertion and further initiate a card reading operation.

While the particular embodiment of the present invention has been shown and described, it will be apparent to those skilled in the art that changes and modifications may be made without departing from the fundamental teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An electrical connector for establishing electrical connection between at least one contact pad of an IC card and conductive elements of a printed circuit board, comprising:
    a substantially planar unitary connector housing supportable on said printed circuit board, said housing having an upper surface, a lower surface and a peripheral wall defining a card insertion slot for insertably accommodating said IC card therein; and
    a plurality of electrical contacts supported by said housing wherein each contact includes an interior contact extent having a deflectable spring-like portion defined thereat, said interior contact extent providing for electrical engagement with said contact pad of said IC card, and an exterior contact extent for termination to said printed circuit board, said interior contact extent of each of said contacts being generally elongate in the direction of card insertion, each of said spring-like portions of said interior contact extents comprising a card wiping portion and a card contact portion, said card wiping portion of each of said contacts being disposed to engage the card upon insertion before the card contact portion.

2. The connector of claim 1 wherein said housing further includes each of an upper guide surface and a lower guide surface circumscribing said card insertion slot.

3. The connector according to claim 1, wherein the card wiping portion of each contact comprises a cantilevered member.

4. The connector of claim 1 wherein said lower surface further comprises at least one support leg protruding therefrom for engagement with a support surface for said connector.

5. The connector according to claim 4, wherein said peripheral wall includes a rearward portion spaced from said upper guide surface in the direction of card insertion.

6. The connector according to claim 5, wherein said electrical contacts are disposed between said rearward portion of said peripheral wall and said upper guide surface.

7. The connector according to claim 6, wherein said exterior contact extent of said contacts are supported by said housing at said rearward portion of said peripheral wall.

8. The connector according to claim 7, wherein said exterior contact extent of said contacts each include a tail projecting normally to the plane of said housing and through the lower surface thereof for connection to said printed circuit board.

9. The connector according to claim 5, wherein said contacts are insertably accommodated in said rearward portion from a rear direction of said housing.

10. The connector according to claim 9, wherein said contacts are positioned by said rearward portion in two separate planes facing in a common direction toward card insertion slot.

* * * * *